D. P. KELLOGG.
METHOD OF MANUFACTURING COMPOSITE TOOLS.
APPLICATION FILED MAR. 30, 1917.

1,327,100.

Patented Jan. 6, 1920.
5 SHEETS—SHEET 1.

INVENTOR
Daniel P. Kellogg.
BY
Barnett Truman
ATTORNEYS.

D. P. KELLOGG.
METHOD OF MANUFACTURING COMPOSITE TOOLS.
APPLICATION FILED MAR. 30, 1917.

1,327,100.

Patented Jan. 6, 1920.
5 SHEETS—SHEET 2.

D. P. KELLOGG.
METHOD OF MANUFACTURING COMPOSITE TOOLS.
APPLICATION FILED MAR. 30, 1917.

1,327,100.

Patented Jan. 6, 1920.
5 SHEETS—SHEET 3.

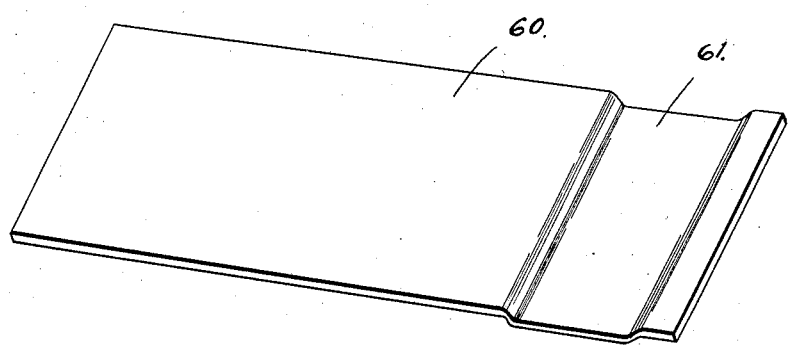
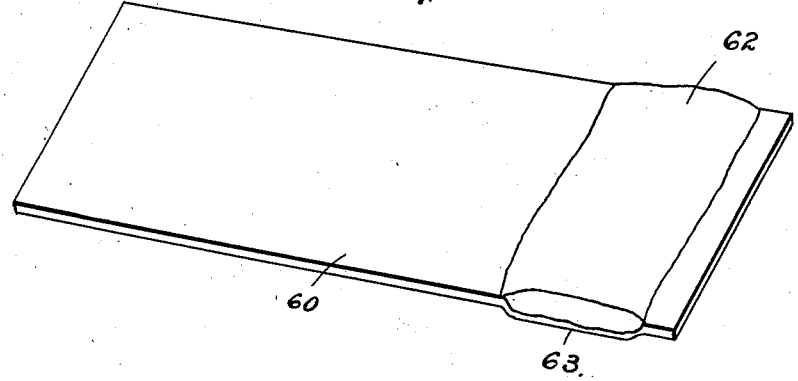
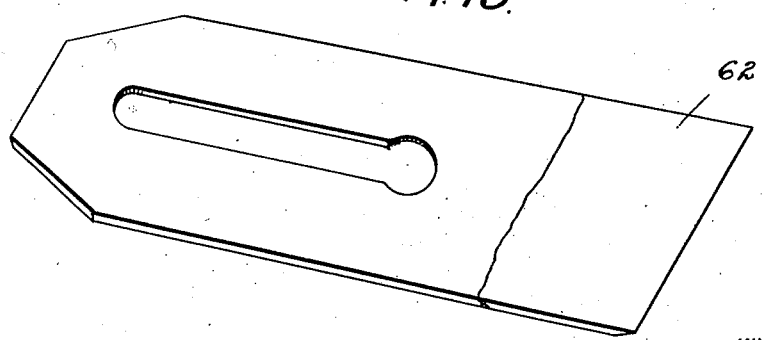

D. P. KELLOGG.
METHOD OF MANUFACTURING COMPOSITE TOOLS.
APPLICATION FILED MAR. 30, 1917.

1,327,100.

Patented Jan. 6, 1920.

INVENTOR
Daniel P. Kellogg
BY
Barnett & Truman
ATTORNEYS.

UNITED STATES PATENT OFFICE.

DANIEL P. KELLOGG, OF LOS ANGELES, CALIFORNIA.

METHOD OF MANUFACTURING COMPOSITE TOOLS.

1,327,100.　　　　Specification of Letters Patent.　　Patented Jan. 6, 1920.

Application filed March 30, 1917. Serial No. 158,596.

*To all whom it may concern:*

Be it known that I, DANIEL P. KELLOGG, a citizen of the United States, residing at Los Angeles, in the county of Los Angeles and State of California, have invented certain new and useful Improvements in Methods of Manufacturing Composite Tools, of which the following is a specification.

My invention relates to a method of manufacturing composite tools, machine elements, or the like.

The object of the invention is the production of certain tools (using the term in a broad sense) by a novel method which, because of the uses to which they are put, can be advantageously made of two metals, that is, very largely of ordinary steel, or other suitable metal, with the cutting portions, facings or bits of hard steel, such as the alloys known as "high speed" or "air hardening" or "self-hardening" steel. The tools or machine elements with which this invention is particularly concerned have ordinarily been made entirely of high speed steel. The advantages of the composite tool over one made entirely of high speed steel are, in the first place, economy of manufacture, high speed steel being an expensive product, and in the second place, greater durability, as tools in which the stocks or shanks are made of high speed steel are easily broken due to the brittleness of the material.

The broader features of my invention are described and claimed in the co-pending joint application of myself and others, Ser. No. 57,767, filed October 25, 1915, and my co-pending application Serial No. 158,595, filed March 30, 1917. The invention of this application is in the nature of an adaptation of the general principles of the invention disclosed in application Serial No. 158,595 to the manufacture of certain particular types or classes of tools.

The invention is illustrated in the accompanying drawings in which—

Figure 9:
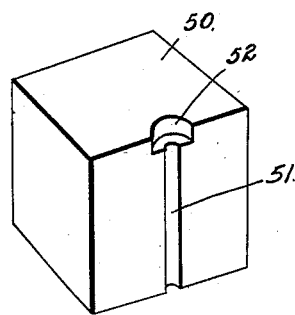
Figure 10:
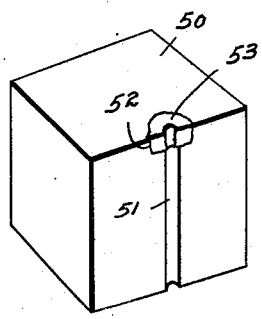
Figure 11:
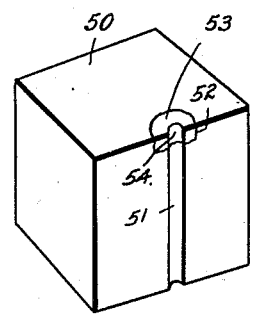

Figs. 9 to 11 inclusive are views in perspective illustrating a similar method of making a composite die block.

Figs. 12 to 16 inclusive are views, in perspective, illustrating the successive development from the blank to the finished tool of a double bladed scraper.

Figs. 17 to 19 inclusive are similar views illustrating the application of the process to the making of a wood working plane bit.

Figs. 20 to 26 inclusive are views, illustrating the development from the blank to the finished tool, of a beveled paring chisel.

Like characters of reference designate like parts in the several figures of the drawings.

Referring first to Figs. 1 to 5 inclusive, 30 designates a blank of ordinary steel, or other suitable metal, for making a tool for finishing the tire faces of railway car wheels. A groove 31 is formed in the head 32 of the blank near the edge of the same. This groove has, generally speaking, a contour corresponding to the tread and flange of a standard gage railway car wheel. It may be formed by means of any suitable die.

Figure 1:
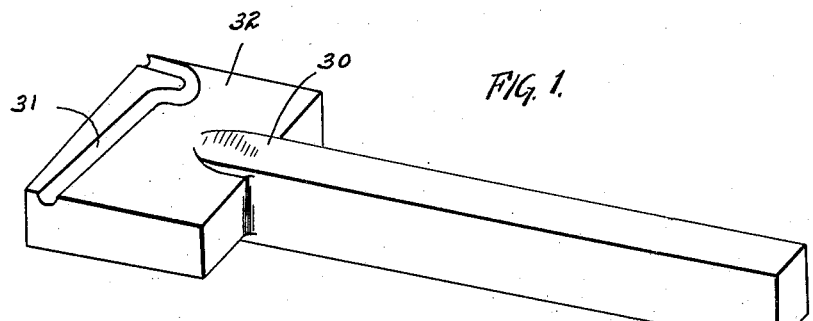
Figure 1 shows, in perspective, a blank forming the stock of a tool for finishing the tire faces of railway car wheels.
Figure 2:
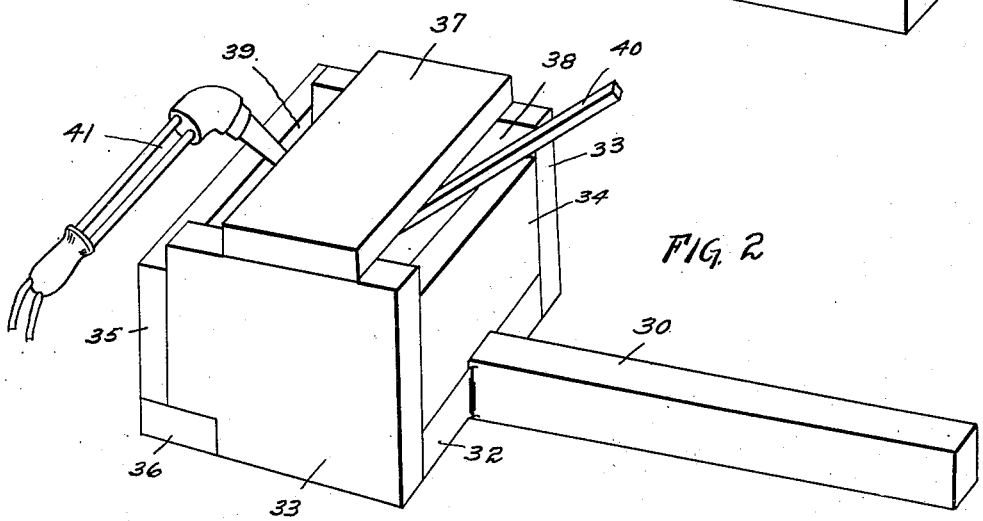
Fig. 2 is a view, in perspective, of the apparatus for welding the high speed steel cutting edge to the stock.
Figure 3:
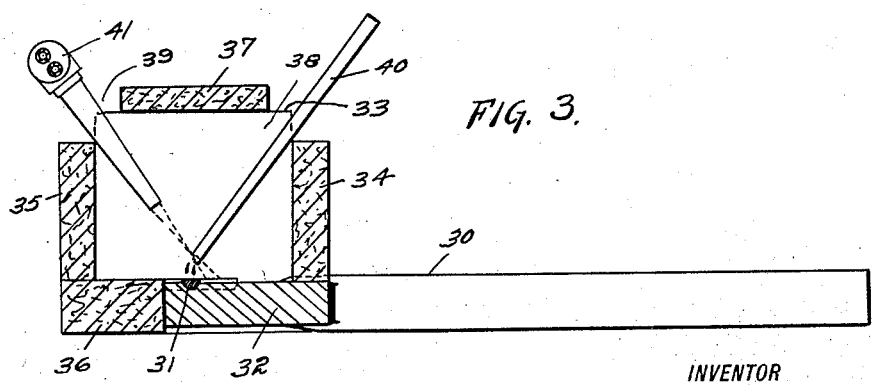
Fig. 3 is a cross sectional view of this apparatus.
Figure 4:
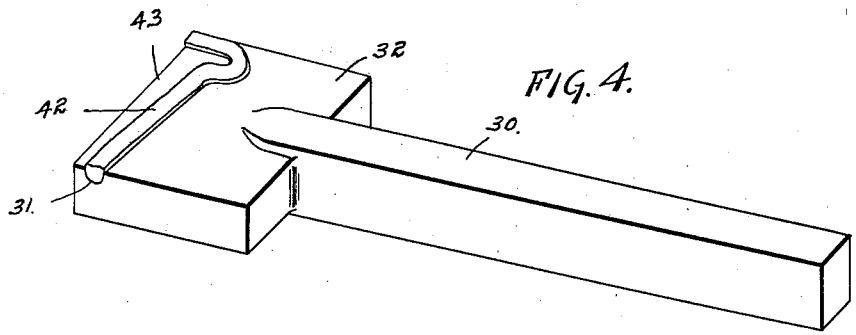
Figs. 4 and 5 are views, in perspective, of the article at different stages of the manufacture, Fig. 5 showing the tool complete.

The blank is inclosed in a retort or furnace built up preferably of bricks or blocks of refractory material substantially in the manner shown in my pending application above referred to. 33, 33 are side blocks, 34, 35 end blocks, the latter resting upon a bottom block 36, and 37 a top or cover block which is a trifle narrower than the opening in the top of the retort so as to leave apertures 38, 39 for the high speed steel weld stick 40 and the torch 41. It will be seen that the ends of the groove 31 in the blank are blocked up by the walls of the retort, which latter, of course, need not necessarily be constructed exactly as shown. The process of welding is carried on preferably by means of an oxy-acetylene flame, or other high temperature flame of the oxy-acetylene type. The torch 41 is first thrust through one of the openings in the top of the retort and manipulated so as to melt the surface of the grooved portion 31 of the blank. The operator then inserts the weld stick 40, of high speed steel, into the opposite opening and melts the end of the weld stick, flowing the molten metal into the groove 31 so as to fill the same, as shown in Fig. 4 in which 42 designates the deposit of high speed steel.

Figure 5:
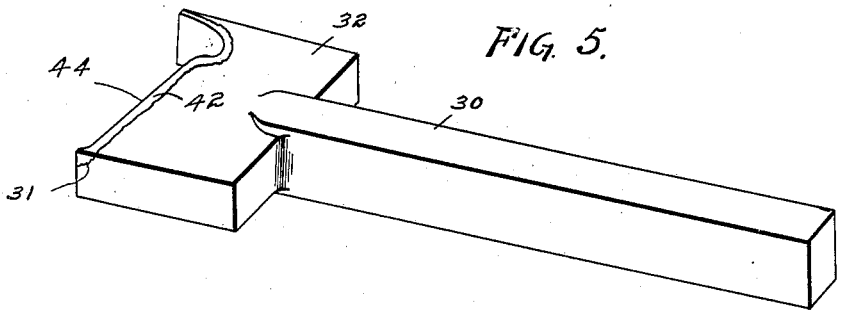

The melting of the metal is carried on under conditions which substantially exclude air from contact with the work. This is accomplished preferably by performing the melting operations within a substantially inclosed space which, in effect, becomes filled with the flames from the torch. Preferably the jet or flame from the torch is not projected directly against the metal particularly in the operation of melting the high speed steel as such direct contact of the flame is likely to oxidize a considerable portion of the metal. In some cases if this operation be carried on in the open air the surface of the molten metal is likely to swell and bubble so that the value of the steel for the purposes to which the tool is intended to be used is destroyed or largely impaired. It is also a matter of considerable importance to withdraw the torch slowly from the work so that the molten metal will have an opportunity to cool and congeal to a certain extent before the air comes in contact with it. In some cases it is desirable to dash powdered charcoal, coke or coal, or other finely divided material over the work as the flame is withdrawn. It is also desirable, if not absolutely necessary to pre-heat the blank and also the high speed steel weld sticks, in a forging furnace, for example, before subjecting them to the extremely high temperature of the torch. By taking these various precautions it is possible to maintain the steel which is to form the cutting edge of the tool in its original condition of purity, free from oxids or other impurities tending to deteriorate its quality. The soft metal 43 of the blank lying outside of the high speed steel deposit 42 is then cut off and the high speed steel dressed to a cutting edge 44 as shown in Fig. 5.

Figure 6:
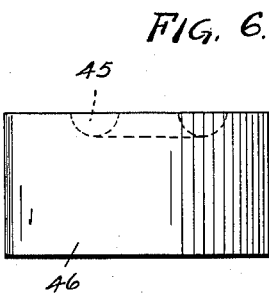
Figs. 6 and 7 are side views, and Fig. 8 a sectional view illustrating the manufacture of a composite punch die.
Figure 7:
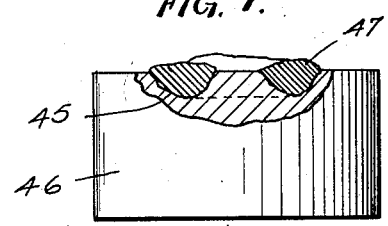
Figure 8:
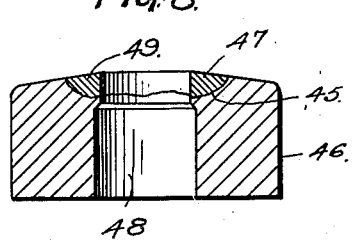

The manufacture of the punch die, which is illustrated in Figs. 6, 7 and 8, is accomplished in the same general way. A circular groove 45 is formed, by suitable die or other means, in the face of a block 46 of ordinary steel. The block of steel is built into a retort of the same general character as that shown in Figs. 2 and 3. The grooved portion of the surface of the block is heated to the fusing point by the torch and is then filled with a deposit of high speed steel 47 (Fig. 7). The block is then drilled to form the central perforation 48 and the inner circumference of the body of high speed steel dressed off to form a cutting edge 49.

The die block, the manufacture of which is illustrated in Figs. 9, 10 and 11, is made in two halves, the development of one of which is shown in these figures. The block 50 is first formed with a semi-cylindrical groove 51 which terminates in an enlargement 52 in which is deposited a body of high speed steel 53 (Fig. 10) which is melted and united to the fused surface of the block in the manner above described. The high speed steel is dressed off, as shown in Fig. 11, to form an accurately semi-circular edge 54.

Figure 12:
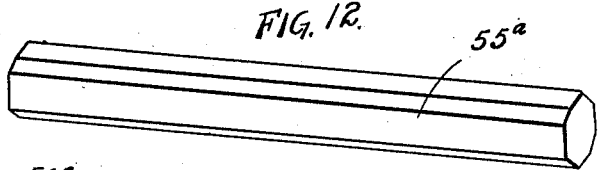
Figure 13:
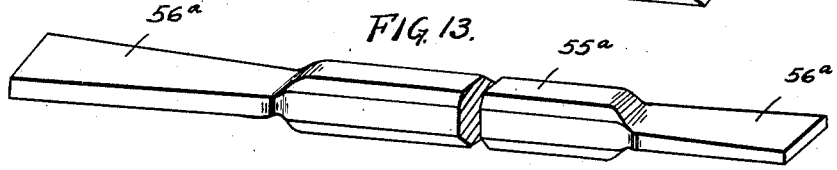
Figure 14:
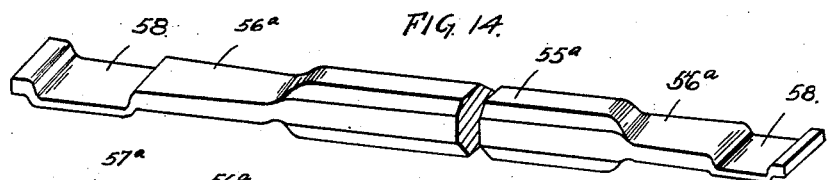
Figure 15:
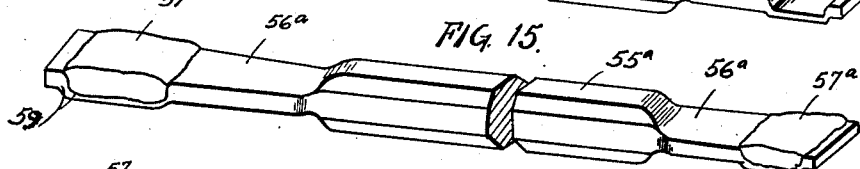
Figure 16:
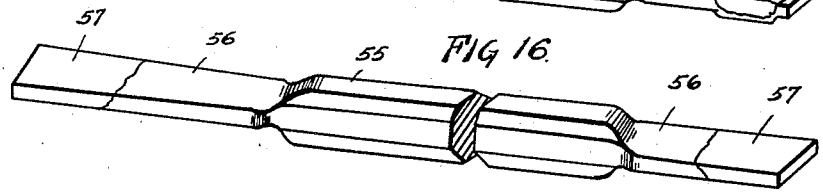
Figure 20:
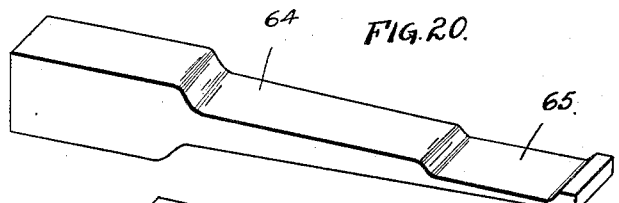

Figs. 12 to 16 inclusive show a double bladed scraper, Fig. 16 showing the finished tool. The tool, it will be seen, consists in an octagonal stock 55 terminating at each end in relatively flat portions 56 which are tipped with cutting edges of high speed steel 57 united edgewise to the flat portions 56 of the stock without any backing, so far as the finished tool is concerned. This tool, which requires a very strong and reliable weld between the high speed steel and the soft metal stock, is made as follows: Fig. 12 shows the octagonal blank of metal 55$^a$, the ends of which are first thinned or flattened down, as indicated at 56$^a$ (Fig. 13). The thinned ends of the blank are pressed to form grooves or recesses 58 (Fig. 14), and these recesses are filled with bodies of high speed steel 57$^a$ which are united to the stock in the manner described above. The soft metal 59 extending around the sides and ends of the bodies of high speed steel is trimmed off and the high speed steel blade dressed to the shape shown in Fig. 16.

Figs. 17, 18 and 19 show the development of a composite plane bit. The soft steel blank 60 is formed with an off-set 61 near one end to which is welded a body of high speed steel 62. This is thinned down by rolling or hammering the soft steel metal 63 at one side and at the outer edge of the high speed steel is cut off and the high speed steel drawn to a cutting edge, as shown in Fig. 19.

Figure 21:
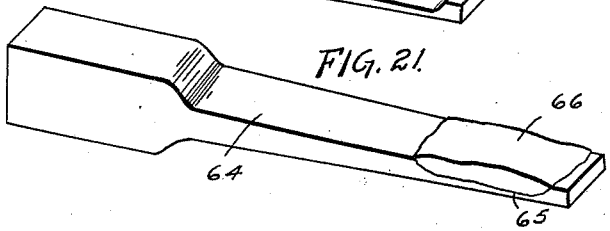
Figure 22:
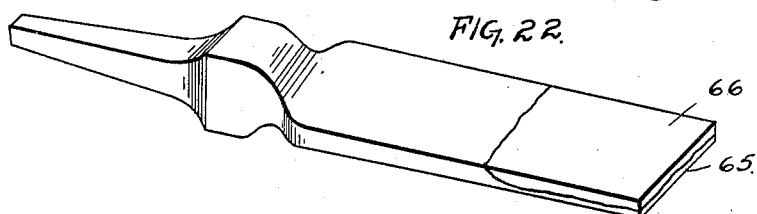
Figure 23:
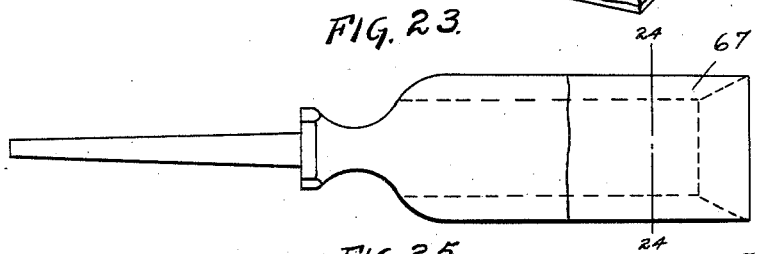
Figure 24:
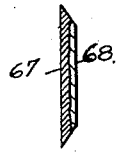
Figure 25:
Figure 26:
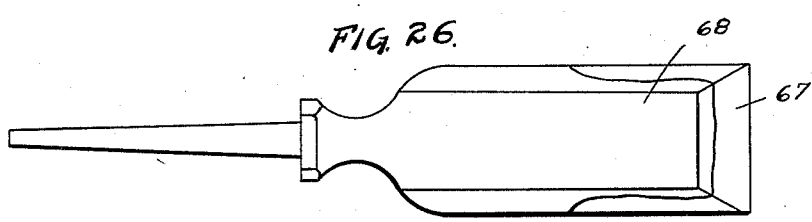

Figs. 20 to 26 inclusive illustrate the manufacture of a beveled paring chisel. The blank 64 is thinned down at one end to form a recess 65 to receive a body of high speed steel 66 (Fig. 21). The blank is then thinned down and flattened out, as shown in Fig. 22, and beveled as indicated in Figs. 23 to 26 inclusive. The high speed steel blade or tip 67 is reinforced by a soft steel tongue or backing 68.

I claim:

1. The method of manufacturing a composite tool of the character described, comprising forming the stock with a recess, welding a body of high speed steel in said recess, trimming away the soft metal along one edge of the high speed steel body, and dressing said body to a cutting edge.

2. The method of manufacturing a composite tool of the character described, comprising forming the stock with a recess, fusing the recessed surface and melting high speed steel and flowing it into said recess under conditions to exclude air from contact with the molten metal, trimming away the soft metal along one edge of the high speed steel body, and dressing said body to a cutting edge.

3. The method of manufacturing a composite tool of the character described, comprising forming the stock with a recess extending across the same near one end, welding a body of high speed steel in said recess and trimming away the soft metal at the end of the stock beyond the body of high speed steel, and dressing the high speed steel body to a cutting edge.

4. The method of making a composite tool having a thin stock of relatively soft metal and a thin blade of high speed steel, the edge of which is united to the edge face of the stock, which consists in forming a recess in one end of the stock, welding a body of high speed steel to the recessed portion of the stock, cutting away the soft metal on one side of and at the outer end of the high speed steel body, and dressing the high speed steel body to a relatively thin blade.

5. The method of making a composite tool having a thin stock of relatively soft metal and a thin blade of high speed steel, the edge of which is united to the edge face of the stock, which consists in forming a recess in one end of the stock, melting high speed steel and the recessed surface of the stock and flowing the high speed steel into said recess under conditions which exclude air from contact with the molten metal, trimming off the soft metal on one side of and at the outer end of the high speed steel body, and dressing the latter to a relatively thin blade.

DANIEL P. KELLOGG.